Nov. 5, 1963 T. G. LANG 3,109,495
BASE VENTILATED HYDROFOIL
Filed Dec. 18, 1962 3 Sheets-Sheet 1

INVENTOR.
THOMAS G. LANG
BY
ATTORNEYS.

Nov. 5, 1963 T. G. LANG 3,109,495
BASE VENTILATED HYDROFOIL
Filed Dec. 18, 1962 3 Sheets-Sheet 2
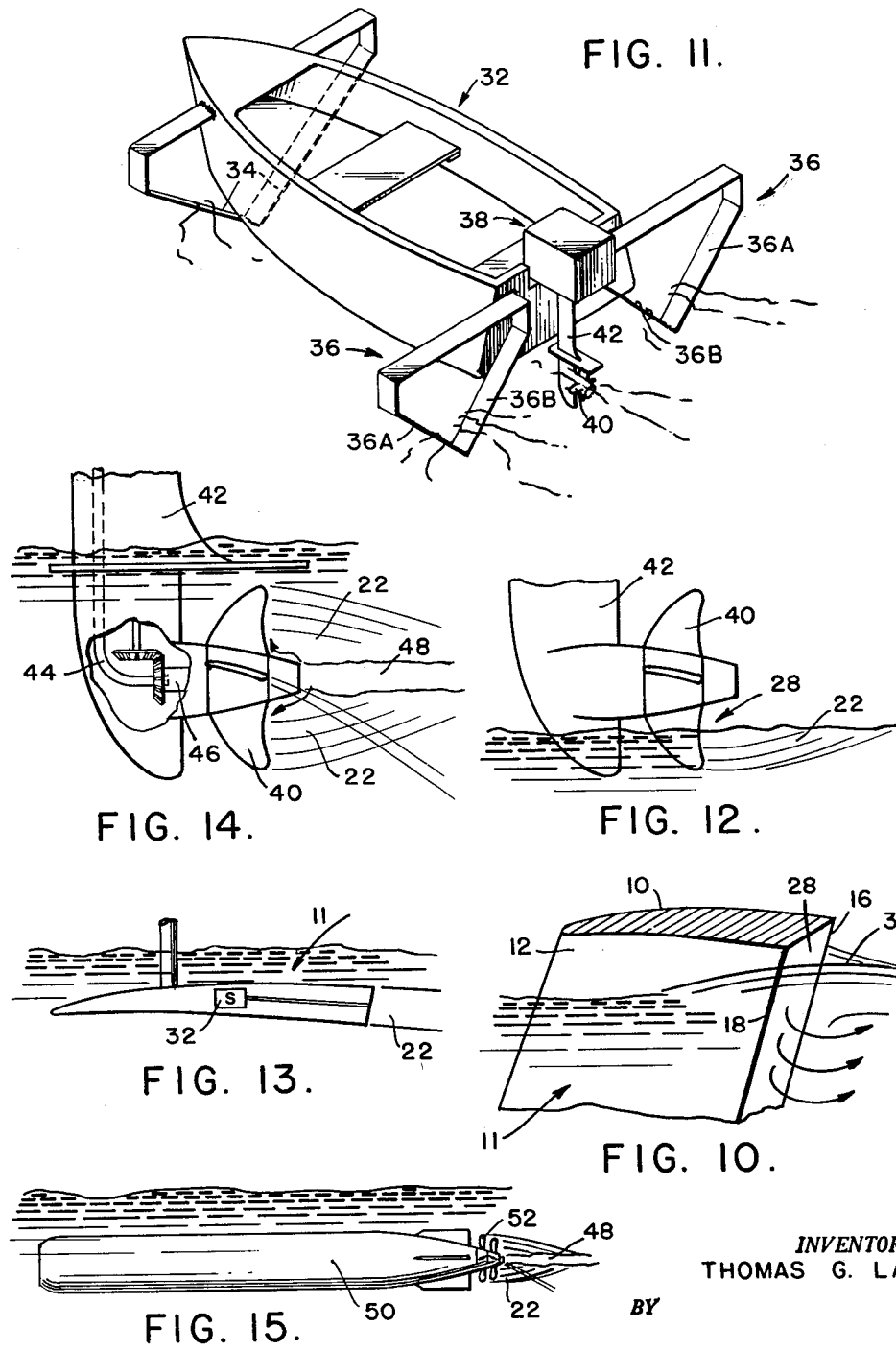
INVENTOR.
THOMAS G. LANG
BY
ATTORNEYS.

Nov. 5, 1963 T. G. LANG 3,109,495
BASE VENTILATED HYDROFOIL
Filed Dec. 18, 1962 3 Sheets-Sheet 3

*INVENTOR.*
THOMAS G. LANG
BY
V.C. Muller
ATTORNEY.

ic Patent Office 3,109,495
Patented Nov. 5, 1963

3,109,495
BASE VENTILATED HYDROFOIL
Thomas G. Lang, 1777 Grevelia St.,
South Pasadena, Calif.
Filed Dec. 18, 1962, Ser. No. 251,707
2 Claims. (Cl. 170—135.4)
(Granted under Title 35, U.S. Code (1952), sec. 266)

The invention described herein, a continuation-in-part of application Serial No. 13,969, filed March 9, 1960, now Patent No. 3,077,173, issued February 12, 1963, may be manufactured and used by or for the Government of the United States of America for governmental purposes without the payment of any royalties thereon or therefor.

This invention relates to hydrofoils, commonly employed for applying lift to boat hulls, propellers and other marine applications where a lifting force is effected by movement of the hydrofoil relative to water.

To provide a better understanding of the terminology hereinafter employed and the analysis of principles involved, reference is first made to FIG. 1 which illustrates the cross section of a foil, to be considered only as a general example, with the various known designations of its parts.

Figure 2:
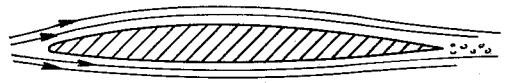

It has been prior practice, and particularly in the more recent developments in this art, to construct hydrofoils with streamlined cross sections as illustrated in FIG. 2, the upper and lower surfaces being defined by arcs which converge at the leading and trailing edges, the trailing edge intersection being relatively sharp. This type operates with both the upper and lower surfaces fully wetted. Above certain speeds, it will cavitate, a known phenomena resulting when water pressure at a zone on the surface decreases to the vapor pressure of water. It is efficient at speeds up to the critical speed at which it begins to cavitate but as cavitation increases the hydrofoil surface at such zones becomes pitted due to collapse of water vapor bubbles, considerable noise is generated, drag increases, life decreases, and performance becomes unsteady or erratic. This critical speed is a function of the cross sectional shape and may be increased by such variants as reduction of section thickness or maintenance of angle of attack close to design angle. Increase in critical speed by reduction of thickness is at the sacrifice of sectional strength, however, thus imposing a restriction to changes as to this feature of design. The restriction of operation to the design angle of attack range also narrows its operational use.

Figure 3:

Another recent development is a hydrofoil known as the "supercavitating" type, illustrated in FIG. 3. It has a cross section which is designed for cavitation in such a way that a cavity bubble springs from the thin sharp leading edge and extends past the trailing edge so none of the upper surface ever contacts water. The lower surface is generally concave and is designed to operate at pressures greater than the static depth pressure so it will never cavitate. The upper surface can be of any shape as long as it does not contact the cavity wall. The purpose of this design is to provide steady predictable lift and drag at high speeds and to eliminate the pitting problem that occurs when the cavity collapses on the hydrofoil. To induce a cavity to form at lower speeds, or when desired at higher speeds, gas can be ducted into the cavity. This modification is sometimes called a "superventilating" hydrofoil. Because the gas tends to cushion the collapsing bubbles, it would be expected that the operation is relatively quiet. The supercavitating hydrofoil has lower efficiency than the fully wetted streamlined hydrofoil. Consequently, fully wetted hydrofoils are normally used up to as high a noncavitating speed as possible by reducing their thickness or optimizing their angle of attack. Since these changes reduce the efficiency of the fully wetted hydrofoil, a point is reached where the supercavitating or superventilating type becomes more efficient.

Figures 5, 9:
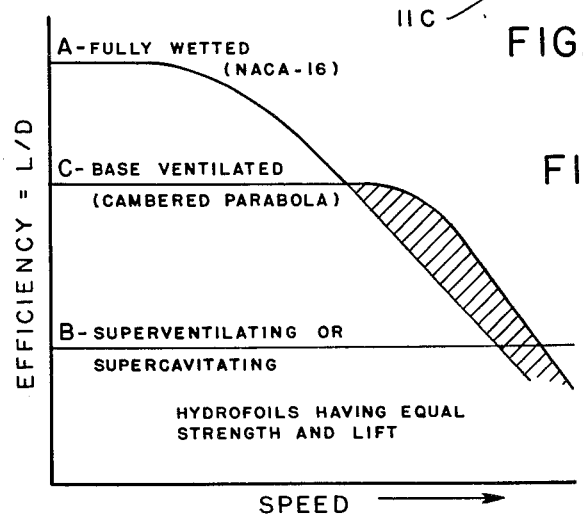

Comparing these two types graphically, curve A of FIG. 9 illustrates the efficiency (lift/drag ratio) with increase in speed of the fully wetted type and curve B illustrates the efficiency of the supercavitating or superventilating type. At speeds below the intersection of these two curves the fully wetted type is more efficient, above which the supercavitating or superventilating type becomes more efficient. Curve C illustrates, generally, the efficiency relationship of the invention to these prior art types.

It is among the principal and more general objects of this invention to provide improved hydrofoils which obviate or minimize disadvantages of those referred to and others of the prior art, and more particularly to provide improvements in efficiency, strength and quiet non-cavitating operation.

Another object is to provide hydrofoils having improved performance within an operational range in which prior hydrofoils have less than optimum characteristics.

Another object is to provide hydrofoils which will operate with optimum results within a relatively wide range of angles of attack.

Figure 1:
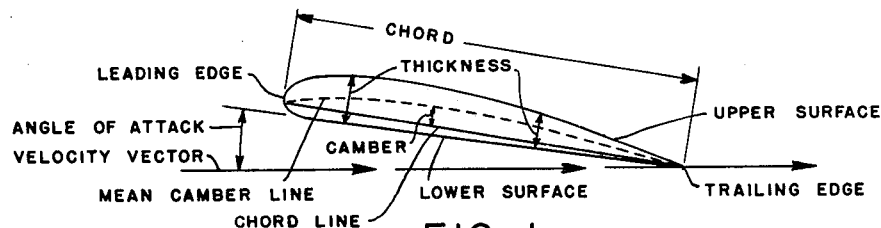
Figure 14A:
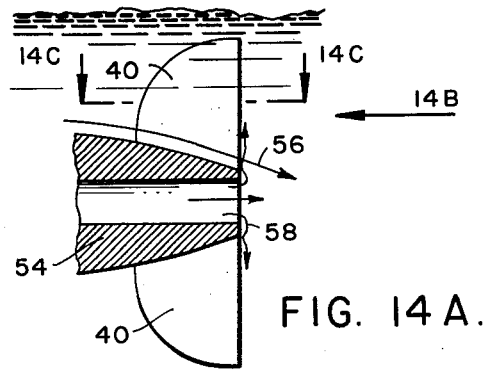
Figure 14B:
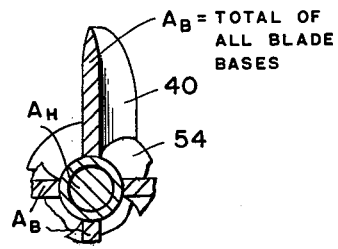
Figure 14C:
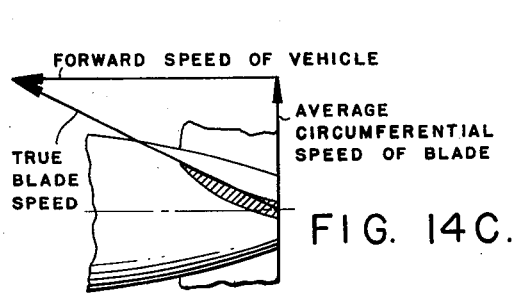
Figure 14D:
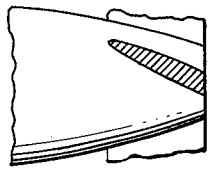
Figure 14E:
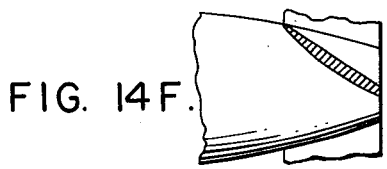
Figure 14F:
Figure 15A:
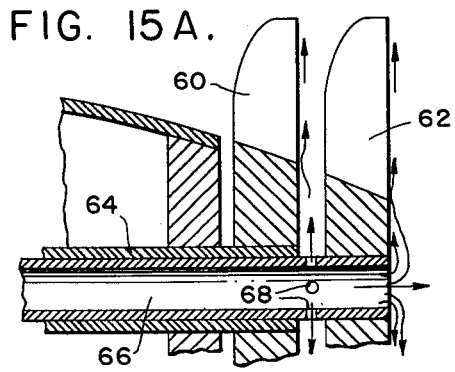
Figure 15B:
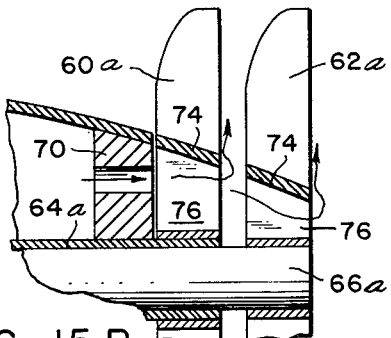

Further objects, advantages, and salient features will become more apparent from a consideration of the description to follow, the appended claims, and the accompanying drawing, in which:

FIG. 1 is a cross section of a general case of hydrofoil forming the basis of nomenclature of the invention, FIG. 2 illustrates a hydrofoil of a certain prior art type, FIG. 3 illustrates a hydrofoil of another prior art type, FIGS. 4 to 8 illustrate hydrofoils constructed in accordance with the invention, FIG. 9 is a graphic comparison of prior art hydrofoils and the invention, FIGS. 10 to 15 illustrate applications of the invention, and FIGS. 14A, 14B, 14C, 14D, 14E, 14F, 15A and 15B illustrate modifications of FIGS. 14 and 15.

Figure 4:
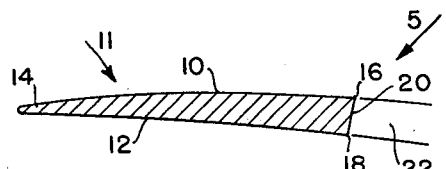

The hydrofoil which forms the subject of the invention has some features which resemble the two general types previously referred to and others which differ from them. Referring to FIG. 4, which illustrates the general features of the invention, this hydrofoil comprises upper and lower surfaces 10, 12 which converge at their forward portions to form a relatively thick leading edge 14, the rear terminals 16, 18 of these surfaces intersecting a third surface 20, hereinafter referred to as the "base" or "base surface" of the hydrofoil which forms a blunt trailing edge. The angles of intersection 24, 26 of the base surface and upper and lower surfaces, as illustrated in FIG. 5, are of the order of 90°, however, this angle may be varied so long as it is in excess of 15° to thus effect separation flow of water at terminals 16, 18 and form boundaries of a region 22 immediately behind surface 20. A gas under pressure is supplied to region 22 from a suitable source as will hereinafter more fully appear. The hydrofoil just described will hereinafter be referred to as a "base ventilated hydrofoil" which is to be understood as one in which gas is supplied only to the region rearwardly of the base in contradistinction to hydrofoils of the type shown in FIG. 3.

The advantages of the base ventilated hydrofoil will become more apparent from the analysis to follow. Considering first the effects of cavitation, it is known that a fully wetted streamlined hydrofoil will cavitate above a critical speed. This speed is decreased as thickness of the hydrofoil increases, as camber increases and as the angle of attack deviates from the design angle (which is usually near zero degrees). If it is to be used at high speeds without cavitating it must be very thin, have small camber and operate at the design angle of attack. If the base ventilated hydrofoil is constructed so that its thickness increases parabolically from the leading edge its susceptibility to cavitation is independent of thickness; consequently, the critical cavitation speed will be decreased only as the camber increases and the angle of attack deviates from the design angle. By eliminating the effect of thickness on cavitation, a base ventilated hydrofoil can be operated at speeds from 50% to 100% greater than fully wetted streamlined hydrofoils without cavitating and may have appreciably more strength because its thickness is independent of cavitation consideration. The thicker cross-section also reduce the effect of angle of attack changes from design on cavitation. Another advantage of the base ventilated hydrofoil is that its efficiency can be significantly higher than that of the supercavitating type hydrofoils which would normally be used at speeds beyond which the fully wetted streamlined hydrofoil cavitates. By slightly modifying the thickness distribution from a parabola to a section wherein the upper and lower arcs at the base are substantially parallel, or even angled inward, the so-called "cavity-drag" at zero ventilation number is reduced to nearly zero. This modification reduces the drag and provides efficiency nearly equal to that of the fully wetted hydrofoils, with cavitation resistance between that of the parabolic shape and the conventional fully wetted shape.

It is well known that fully wetted hydrofoils may maintain laminar flow to about their section of maximum thickness. If such thickness is chosen near the base of the hydrofoil, which is within the purview of this invention, laminar flow can be maintained substantially across both the upper and lower sections, thereby significantly reducing frictional drag which would otherwise result from the maximum thickness being considerably forward of the trailing edge as is conventional in fully wetted hydrofoils.

Figure 6:
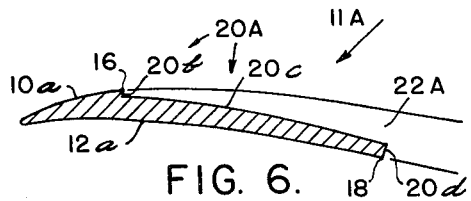
Figure 7:
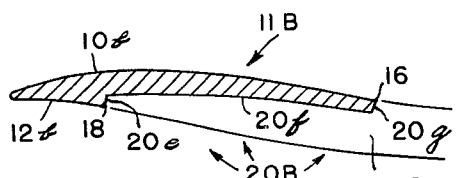

As described in connection with FIGS. 4 and 5, the case of the hydrofoil forms a plane generally perpendicular to the terminal upper and lower surfaces of the hydrofoil. This is not essential to all aspects of the invention since the base need not necessarily be a plane but may be some other form of surface. FIG. 6 illustrates one embodiment wherein the upper surface 10a is significantly shorter than the lower surface 12a and wherein the base surface 20a is formed by surfaces 20b, 20c, 20d. These latter surfaces provide a region 22A into which gas is delivered. FIG. 7 illustrates another embodiment wherein upper surface 10b is significantly longer than lower surface 12b and wherein the surface 20B forming the base is formed by surfaces 20e, 20f and 20g. These latter surfaces similarly provide a region 22B into which gas is delivered. Comparing FIGS. 6 and 7, the latter obtains most of its lift from the upper surface, and is more efficient than the former which obtains most of its lift from its lower surface but the former is more resistant to cavitation effects than the latter.

Figure 8:
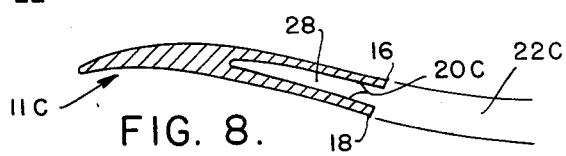

FIG. 8 illustrates another embodiment wherein surface 20C extends forwardly within the hydrofoil providing a duct 28 into which gas is delivered. The advantages of such a duct may be better understood from a consideration of FIG. 10 which illustrates a hydrofoil, such as that shown in FIG. 4, which is disposed angularly to and intersecting the surface of the water which may be termed a surface piercing hydrofoil. As will be apparent, the upper end of region 22 now communicates by duct 28 with ambient air. Since the pressure in region 22 is below ambient water and air pressure, tending to produce pressure drag, ambient air will flow downwardly into such region, as shown by arrows, raising its pressure and reducing the pressure drag. Above certain speeds, however, spray sheets 30 will form around the surface of the hydrofoil, above the water surface and extending rearwardly of edges 15 and 18, which tend to close duct 28, thus restricting flow of air into region 22. The area of the air duct may be enlarged to obviate this restriction of flow by providing an air channel or duct within the hydrofoil as illustrated in FIG. 8. The form of hydrofoil illustrated in FIG. 10 (or FIG. 4) may similarly be modified (not shown) to provide an enlarged air duct by adding rearwardly projecting plates to the surface of the hydrofoil thus, in effect, producing a cross section similar to that of FIG. 8.

Referring now to applications of the invention, FIG. 11 illustrates a boat hull 32 supported above the water by a forward dihedral surface piercing hydrofoil 34 and a rear pair of hydrofoils 36. While all of these hydrofoils may be of the base ventilated type, for purposes of illustration, and as will sometimes be desired, only the front hydrofoil may be considered as entirely of the base ventilated type, the outboard portions 36A of the rear hydrofoil being of the conventional fully wetted type, inboard portions 36B being of the base ventilated type. Each base ventilated hydrofoil, where it pierces the water, forms a duct 28, like that described in connection with FIG. 10, which ventilates a region 22 behind its base. The front hydrofoil, particularly, is preferably further modified from the fully wetted type by choice of a section which will provide greater lift on its lower surface and less on its upper surface for the reason that the front hydrofoil is subject to more adverse wave conditions than the rear hydrofoil and tends to suck in ambient air to its upper surface, reducing or destroying lift. With such choice of section, the tendency to ventilate the upper surface is reduced and such air as may ventilate it destroys a lesser portion of the lift.

The boat of FIG. 11 may be propelled in any suitable manner, such as by a conventional outboard motor 38 which rotates a propeller 40 through power transmission mechanism contained in strut 42. The motor assembly may be arranged so that the propeller is only partially submerged as shown in FIG. 12 or fully submerged as shown in FIG. 14 when the boat is operating in its supported position above the water when in the partially submerged position, the inner portions of the propeller blades which rotate for a portion of a revolution in the water will each form a duct 28, like that described in connection with FIG. 10 which will permit ambient air to enter in to each region 22 behind a blade venting it in the same manner as the lifting hydrofoils previously described. If the propeller is to operate completely submerged, as shown in FIG. 14, the propeller blades will not form natural air ducts to ambient air, as in FIG. 12, and they must then be supplied with gas through a suitable duct provided for this purpose which communicates with ambient air or other source of gas. As an example of such construction, a duct 44 extends through strut 42, its lower end communicating with a hollow propeller shaft 46, so that gas may pass rearwardly through such shaft to form a cylindrical axial gas stream 48. Since this gas stream is adjacent the inner ends of all of the propeller blades it will be apparent that gas will flow into region 22 behind the base of each blade, the sectional shape of which may be in accordance with any of the hydrofoils of the invention. In its most simple form, the upper end of duct 44 may communicate with ambient air to thus effect ventilation of the bases of the hydrofoil blades to ambient air even though they may operate completely submerged. If a source of gas, other than ambient air is desired, the upper end of duct 44 may communicate with the exhaust from the engine. Since it is conventional to exhaust gasses from an outboard motor below the surface of the water to thus muffle their otherwise objectionable noise, the reorientation of the exhaust to a hollow propeller shaft not only serves the same purpose of muffling but utilizes such gases for increasing the efficiency of the propellers by venting their bases in accordance with the concepts of the invention. It will also be apparent that a hollow propeller shaft is not essential to such concepts and that exhaust gas or ambient air may be delivered to any suitable location adjacent the blades so that it will be delivered into the regions 22.

FIG. 13 illustrates a general application of a fully submerged hydrofoil 11 for applying lift to a boat or the like provided with a source of gas S which may be delivered to region 22 behind the base of the hydrofoil. Source S may be ambient air, exhaust from an engine, both as previously described, or a separate pressure source such as compressed air which may be delivered at a desired pressure into region 22.

FIG. 15 illustrates another application of the invention in which torpedo 50 is propelled by one or more base ventilated propellers 52 which may be supplied with gas through a hollow propeller shaft like that shown in FIG. 14. Such shafts are well known in the torpedo art, it being conventional to exhaust engine gases from a steam or other gas turbine axially through the propeller shaft.

The application of the invention as previously described in connection with FIGS. 14 and 15 will now be described in more detail, as it relates to criteria of design which have been discovered since the filing of the application previously identified. FIGS. 14A to 14F illustrate a base vented propeller 40 which may be employed in the same environment as shown in FIGS. 14 and 15 but differs in that the rear end of hub 54 terminates substantially flush with the inner ends of the propeller bases, rather than projecting rearwardly beyond such bases. As best shown in FIG. 14A, the water flow stream across the rear outer edge of the hub is somewhat as depicted by flow lines 56. To effect maximum ventilation to the areas behind the blade bases and the region behind the hub, the hub preferably terminates in the same plane as the inner ends of the blade bases so that ventilation will be effected along the entire lengths of the bases as indicated by arrows 58. For maximum propeller efficiency, it has been discovered that the amount of gas delivered at the rear of the hub must be equal to or greater than the critical minimum to be subsequently described. If the blade cross section is parabolic, as shown in FIG. 14D, or cambered parabolic, as shown in FIG. 14E then the quantity of gas delivered should be:

$$Q \gtreqqless .03[A_B V_B + A_H V_H]$$

where:

$Q$ = Volume in cubic feet/sec. (at ambient pressure).
$A_B$ = Area of the blade bases in sq. ft.
$V_B$ = True velocity of the blades in ft./sec.
$A_H$ = Area of the hub at its juncture with the blade bases in square feet.
$V_H$ = Forward velocity of the hub (and vehicle) in ft./sec.

The true velocity of the blades is illustrated in FIG. 14C and is the vector component of forward speed of the vehicle and average rotational speed of a blade. If the blade cross section is more streamlined than a parabola, as shown in FIG. 14F, then the constant .03, above, becomes about .015.

As previously described, FIG. 15 illustrates a modification of the invention in which one or more base ventilated propellers are provided on a torpedo and engine gases are discharged through a hollow torpedo drive shaft. FIG. 15A illustrates a further refinement in which propellers 60, 62 are driven by counter rotating shafts 64, 66 and the forward propeller 60 is ventilated by gas which exhausts through apertures 68 in shaft 66 so that such gas flows directly to the inner ends of the bases of the blades of forward propeller 60. As will be apparent, the remainder of the gas ventilates the bases of the blades of rear propeller 62. With this construction the forward propeller may be more adequately ventilated than with the construction shown in 15 wherein ventilation of the forward propeller requires a more tortuous flow of gas between the blades of the rear propeller.

FIG. 15B illustrates a further modification which more adequately ventilates both propellers, but instead of delivering gas through the propeller shafts, 64a, 66a, it is delivered through a bulkhead 70 and thence through hollow propeller hubs which may be formed as shroud rings 74 connected to their shafts by spiders 76. As will be apparent, also, forward propeller 60a may be ventilated in the manner shown in FIG. 15B and the rearward propeller ventilated through a hollow drive shaft as shown in FIG. 15A.

The criteria of design will vary considerably, depending upon the particular application of the invention but will involve, mainly, design criteria well understood in the art of hydrodynamics. Certain criteria has been found, however, to provide optimum results among which are general proportions of the base the width of which is preferably in excess of 40% of the maximum thickness of the hydrofoil section; the maximum thickness is less than 40% of the chort length, and the radius of curvature of the leading edge is between ½% and 10% of the maximum thickness. As previously referred to, the angle between tangents to the rear terminals of the upper and lower surfaces should be at least 15° to the base portions adjacent thereto to provide a sharp separation of flow across these terminals to thus provide walls of a well defined region behind the base into which gas may be supplied. When used as a boat supporting hydrofoil, and for maximum lift, the curvature of the upper surface is preferably convex and the lower surface flat or concave as shown in FIG. 4. In either case, the leading edge is preferably rounded sufficiently to reduce susceptibility to cavitation with changes in angle of attack if the hydrofoil operates under such changes.

Obviously many modifications and variations of the present invention are possible in the light of the above teachings. It is therefore to be understood that within the scope of the appended claims the invention may be practiced otherwise than as specifically described.

What is claimed is:

1. A vehicle propeller adapted to operate completely submerged and fully wetted in water having a rotatable hub and a plurality of angularly spaced blades extending outwardly therefrom, each blade having leading and trailing edges, the trailing edge of each blade forming a base surface of substantial thickness with respect to the leading edge thickness, said hub having a circular cross section at its rear end, and means for exhausting gas axially rearwardly through said hub into ambient water in sufficient quantity to fully ventilate the region behind said hub and the regions behind the blade base surfaces to minimize pressure drag, in accordance with the relationship:

$$Q \gtreqqless K(A_B V_B + A_H V_H)$$

wherein:

$Q$ = volume of exhaust gas in cubic feet/sec.
$A_B$ = area of the blade base surfaces in square feet
$V_B$ = average true velocity of the blades in ft./sec.
$A_H$ = area of said hub cross section in square feet
$V_H$ = forward velocity of the hub in ft./sec., and
$K$ is a constant substantially between .01 and .04.

2. A propeller in accordance with claim 1 wherein it is the rearmost propeller of a pair of like tandem contra-rotating propellers, and means for supplying gas to the bases of the forward propeller in sufficient quantity to minimize their pressure drag.

References Cited in the file of this patent

UNITED STATES PATENTS

| | | |
|---|---|---|
| 1,190,755 | Hahn | July 11, 1916 |
| 2,213,609 | Ronning | Sept. 3, 1940 |
| 2,213,612 | Ronning | Sept. 3, 1940 |
| 2,269,030 | Lysholm | Jan. 6, 1942 |
| 2,608,171 | Pearce | Aug. 26, 1952 |
| 2,969,759 | Giles | Jan. 31, 1961 |
| 3,077,173 | Lang | Feb. 12, 1963 |

FOREIGN PATENTS

| | | |
|---|---|---|
| 124,583 | Sweden | Apr. 5, 1949 |
| 449,378 | Germany | Sept. 12, 1927 |